(12) United States Patent
Casola et al.

(10) Patent No.: US 6,196,893 B1
(45) Date of Patent: Mar. 6, 2001

(54) TOY WITH PERSONALIZED VOICE MESSAGE AND SYSTEM FOR REMOTE RECORDING OF MESSAGE

(76) Inventors: Robert Casola; Kate Berger, both of 6278 N. Federal Hwy. #117, Ft. Lauderdale, FL (US) 33308

( * ) Notice: Subject to any disclaimer, the term of this patent is extended or adjusted under 35 U.S.C. 154(b) by 0 days.

(21) Appl. No.: 09/152,094

(22) Filed: Sep. 11, 1998

(51) Int. Cl.[7] .................................................. A63H 3/28
(52) U.S. Cl. .............................................. 446/297; 446/81
(58) Field of Search .............................. 446/71, 81, 297, 446/302, 397, 175; 379/57, 58, 61

(56) References Cited

U.S. PATENT DOCUMENTS

| | | | | |
|---|---|---|---|---|
| 4,249,338 | * | 2/1981 | Wexler | 446/297 X |
| 4,878,871 | * | 11/1989 | Noto | 446/81 X |
| 4,930,148 | | 5/1990 | Lee | 379/58 |
| 5,029,214 | * | 7/1991 | Hollander | 446/297 X |
| 5,059,149 | | 10/1991 | Stone | 446/73 |
| 5,184,971 | | 2/1993 | Williams | 446/142 |
| 5,279,514 | * | 1/1994 | Lacombe et al. | 446/297 |
| 5,376,038 | * | 12/1994 | Arad et al. | 446/297 |
| 5,393,257 | | 2/1995 | Spector | 446/27 |
| 5,468,172 | | 11/1995 | Basile | 446/299 |
| 5,489,231 | | 2/1996 | Leyser | 446/302 |
| 5,648,999 | * | 7/1997 | Easterling et al. | 446/297 X |

* cited by examiner

*Primary Examiner*—Sam Rimell
(74) *Attorney, Agent, or Firm*—Richard M. Saccocio P.A.

(57) ABSTRACT

A toy having a personalized voice message stored therein for selective playback comprising a toy and a message storage and playback device. The message storage and playback device is structured for placement within the internal cavity of the toy and includes at least one memory portion having a voice message stored therein and a playback portion. The playback portion includes an audio output circuit and a transducer, structured to retrieve the voice message from the desired memory portions and audibly output the voice message, and a control circuit, structured to limit play back of the voice message so that the voice message is only played back once each time the switch is actuated and minimize the current drawn by the playback portion to prolong the useful life of the batteries. The toy further comprises means for remote recording of a voice message, via a telephone, in one of its memory portions.

10 Claims, 2 Drawing Sheets

TOY WITH PERSONALIZED VOICE MESSAGE AND SYSTEM FOR REMOTE RECORDING OF MESSAGE

BACKGROUND OF THE INVENTION

1. Field of the Invention

The present invention relates to toys and, more particularly, to a toy having a personalized voice message stored therein for selective playback and a system for remote recording of such voice message.

2. Description of the Related Art

It is not uncommon for people to send personalized messages to children or other loved ones when away from home. As such, toys and stuffed animals capable of recording and playing back voice messages have become increasingly popular.

Over the last several years, many different types of toys which enable the recording and playback of voice messages have been developed. For instance, U.S. Pat. Nos. 5,468,172, 5,279,514, 5,184,971 and 5,489,231 disclose various different types of toys having means for recording a voice message, memory means for storing the voice message and means for selectively playing back the recorded voice message.

Although useful for their intended purposes, these prior art devices have not proven to be entirely satisfactory. Specifically, these devices typically will continuously replay the message as long as the activation switch is depressed. This often poses a problem with children who tend to hold the switch in the depressed position, thereby replaying the message over and over and draining the batteries. Additionally, it is not uncommon for the switch to become depressed when storing the device, again causing the message to be replayed over and over until the batteries are fully drained. Another problem with the prior art devices is their excessive current draw, which further drains the batteries, thereby shortening their useful life. Also, these prior art devices are specifically designed to record the voice message via recording means in the device. Consequently, a person desiring to send a personalized voice message in these devices must purchase and physically take possession of the device, manually record the message by speaking directly into the device and then package and mail the device to its intended recipient. This process can be very time consuming, thereby dissuading people from doing it.

Accordingly, there is a need in the art for a toy having means for preventing continuous replaying of the recorded message when the activation switch is held down and which reduces the amount of current drawn, thereby preventing excessive drain on the batteries and extending their useful life. Any such device should enable the purchaser to purchase, record the message and have the device shipped to the desired recipient from any remote location without having to take physical possession of the device. The present invention is particularly suited to overcome those problems which remain in the art in a manner not previously known.

SUMMARY OF THE INVENTION

The present invention is directed towards a new and improved toy having a personalized voice message stored therein for selective playback comprising a toy, such as a stuffed animal or other toy having an internal cavity, and a message storage and playback device. The message storage and playback device is structured for placement within the internal cavity of the toy and includes at least one memory portion having a voice message stored therein and a playback portion. The playback portion includes an audio output circuit and a transducer, structured to retrieve the voice message from the desired memory portions and audibly output the voice message, and a control circuit, structured to limit play back of the voice message so that the voice message is only played back once each time the switch is actuated and minimize the current drawn by the playback portion to prolong the useful life of the batteries. The toy also includes means for remote recording of a voice message in one of its memory portions. Such means comprises a computer interconnected with the public telephone system and having means for receiving a voice message from the public telephone system and converting the voice message into a digital signal, a hard drive for storing the digital signal and means for retrieving the digital signal from the hard drive and downloading it to one of the memory portions of the message storage and playback device.

It is an object of the present invention to provide a new and improved toy having a personalized voice message therein for selective playback which has all the advantages of the prior art devices and none of the disadvantages.

It is another object of the present invention to provide such a device which prevents continuous replaying of the recorded message when the activation switch is held down.

It is also an object of the present invention to provide such a device which reduces the amount of current drawn, thereby preventing excessive drain on the batteries and extending their useful life.

It is a further object of the present invention to provide a system for remote recording of a personalized voice message into a toy, thereby enabling the purchaser to purchase, record the message and have the device shipped to the desired recipient from any remote location without having to take physical possession of the device.

It is yet another object of the present invention to provide such a system which enables remote recording of the voice message via the telephone system.

These and other objects and advantages of the present invention will become more readily apparent in the description which follows.

BRIEF DESCRIPTION OF THE DRAWINGS

For a fuller understanding of the nature of the present invention, reference should be had to the following detailed description, taken in connection with the accompanying drawings in which.

Like reference numerals refer to like parts throughout the several views of the drawings.

DETAILED DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Figure 1:
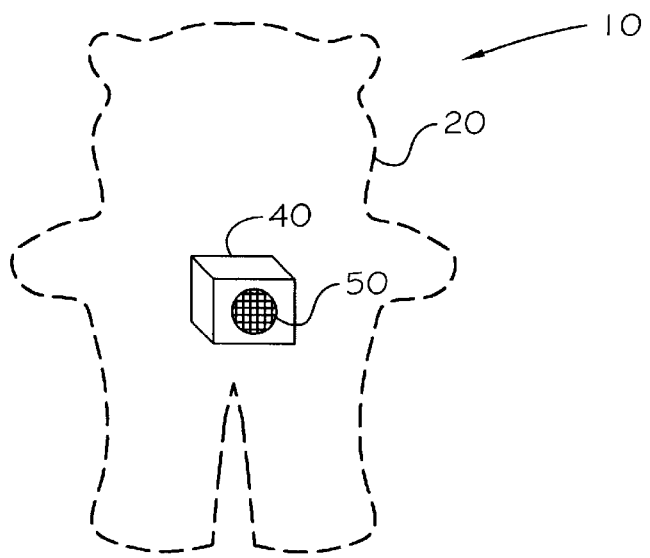
FIG. 1 is a front plan view of the toy of the present invention, in partial section, showing the message storage and playback device in the internal cavity.
Figure 2:
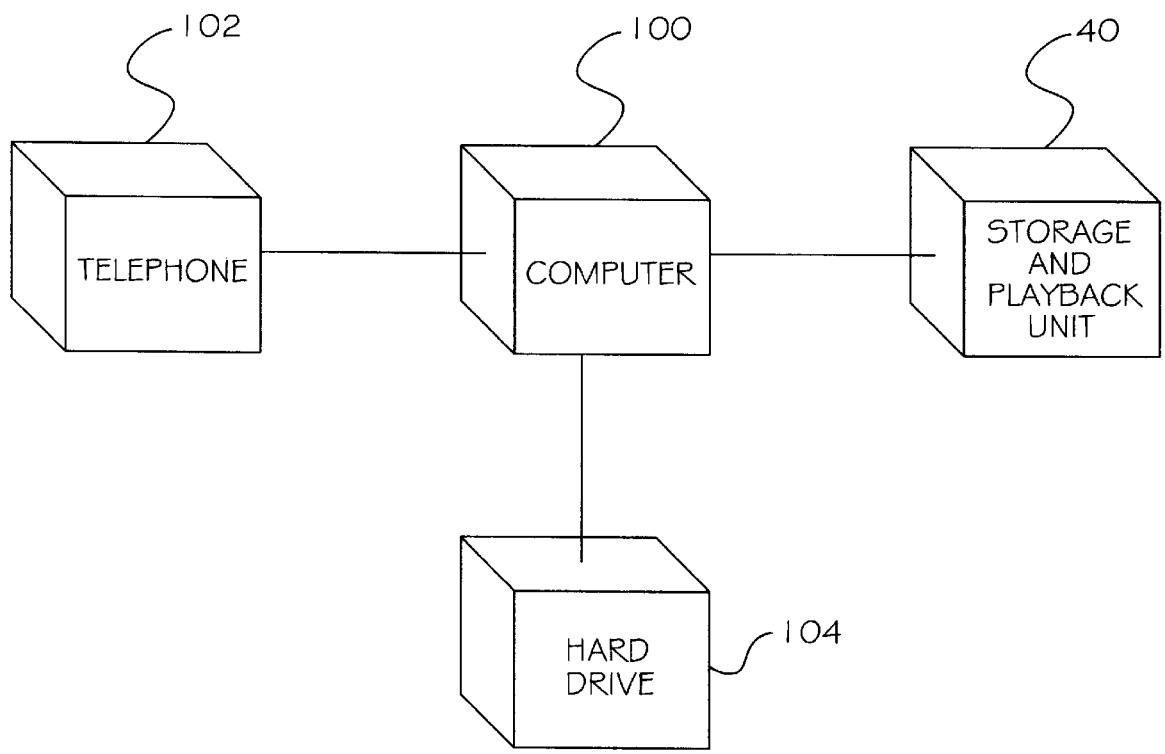
FIG. 2 is a block diagram showing the remote recording means.
Figure 3:
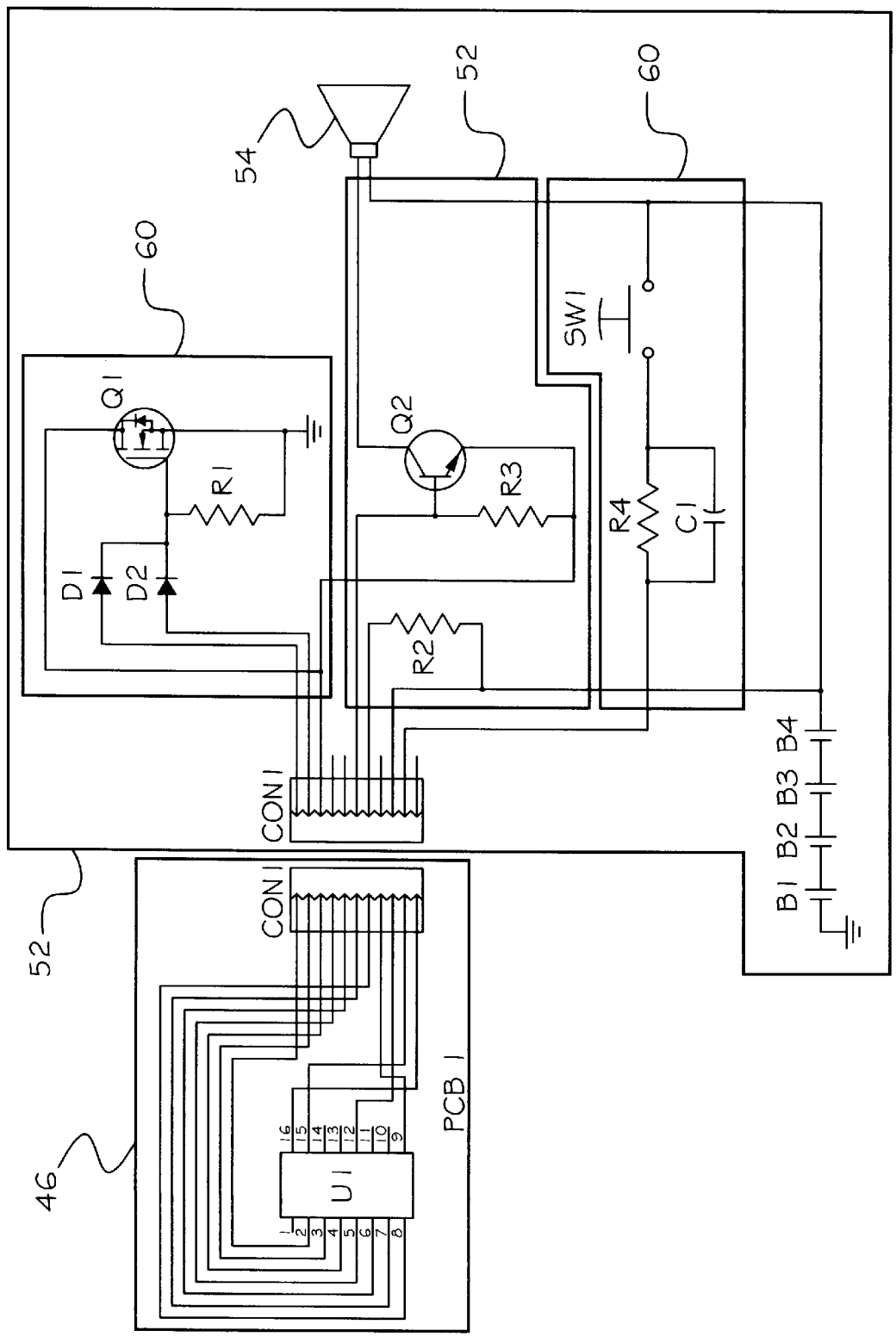
FIG. 3 is a schematic diagram of the message storage and playback device circuitry.

As shown in FIGS. 1 and 3, the present invention is directed towards a new and improved toy having a personalized voice message stored therein for selective playback 10 comprising a toy 20 and a message storage and playback device 40. The toy 20 may be of any type having an internal cavity, such as a bear or other stuffed animal.

The message storage and playback device 40 is structured for placement within the internal cavity of the toy 20. The message storage and playback device 40 includes at least one memory portion 46 electrically interconnected with a playback portion 50. Each memory portion 46 includes an integrated circuit U1 capable of storing a voice message therein and a timed output structured to output the stored voice message for a predetermined period of time. In the preferred embodiment, the integrated circuit U1 is an IS22C020 voice chip manufactured by Integrated Silicon Solution, Inc., which stores the voice message digitally and provides a pulse width modulated audio output signal. However, any other suitable digital or analog voice chip capable of storing voice messages and which includes a timed output may, alternatively, be used. The message storage and playback device 40 may include multiple memory portions 46 for selective playback of more than one voice message.

The playback portion 50 includes an audio output circuit 52 and a transducer 54, structured to retrieve the voice message from the desired memory portions 46 and audibly output the voice message, and a control circuit 60. The audio output circuit 52 includes a transistor Q2 having its base serially connected to the current output of the integrated circuit U1, its emitter serially connected to the integrated circuit U1 ground and its collector connected to transducer 54. During playback of the voice message, transistor Q2 receives the current output of the integrated circuit U1 and provides it to the transducer 54 for conversion to an audible output.

The control circuit 60 includes a normally open momentary switch SW1 for activating the audio output circuit 52. The switch SW1 is serially connected to batteries B1, B2, B3, B4 and a high resistance resistor R4, which, in turn, is serially connected to the trigger input of the IS 22C020 integrated circuit U1. A discharge capacitor C1 is connected in parallel with the resistor R4. The switch SW1, resistor R4 and capacitor C1 are structured to reduce the current to the trigger input of the integrated circuit U1 upon continuous closure of the switch SW1, thereby causing the integrated circuit U1 timed output to shut off after a predetermined period of time. This automatic shutoff feature limits play back of the voice message so that the voice message is only played back once each time the switch SW1 is actuated. The switch SW1 must be released for at least two seconds to allow the capacitor to recharge and the message to be replayed. This feature is useful to prevent continuous playback of the voice message when the switch SW1 is held down by children or otherwise stuck in the depressed position, thereby conserving the useful life of the batteries B1, B2, B3, B4.

The control circuit 60 further includes a diode, such as a 1N914 serially connected between the integrated circuit U1 output and the gate of a field effect transistor Q1, such as a 2N7000. The transistor Q1 drain is serially connected to the integrated circuit U1 ground and the transistor Q1 source is also tied to ground. The transistor Q1 acts as an on/off switch for the playback portion 50 by maintaining the power to the playback portion 50 off Upon actuating the switch SW1, the pulse into the trigger input of the IS22C020 integrated circuit U1, from batteries B1, B2, B3, B4 through C1, activates the IS22C020 integrated circuit U1. Output pulses from the IS22C020 integrated circuit U1 latch transistor Q1 on, which, in turn, powers the audio output circuit 52. Without this novel design, the playback portion 50 would draw approximately 3 milliamps, resulting in a battery shelf life, using AAA batteries, of approximately 20 days. By using transistor Q1 in this manner, the current drawn by the playback portion 50 is approximately 3 microamps, resulting in a battery shelf life, using AAA batteries, of approximately 5 years, which is essentially the shelf life of the batteries themselves.

The toy having a personalized voice message stored therein for selective playback 10 of the present invention may also include means for remote recording of a voice message in one of the memory portions 46. Such means comprises a computer 100 interconnected with a public telephone system 102 and having means for receiving a voice message from the public telephone system 102 and converting the voice message into a digital signal, a hard drive or other compatible memory device 104 for storing the digital signal and means for retrieving the digital signal from the hard drive 104 and downloading it to one of the memory portions 46 of the message storage and playback device 40. The technology for interconnecting the computer 100 with the public telephone system 102, converting the voice message signal for storage on the hard drive 104, and retrieving the digital signal from the hard drive 104 and downloading it to an external memory device is well known in the art.

In use, a purchaser may place an order with an operator and receive a purchase order number or code. The purchaser may then call a telephone number which accesses the computer 100, key in the purchase order number or code and record a voice message of a predetermined length, which is stored on the computer 100 hard drive 104. When the purchase order is processed, the voice message may be retrieved from the hard drive 104 and downloaded into the IS22C020 integrated circuit U1, which is mounted on circuit board PCB1 having an edge connector CON1 to facilitate connection to the computer 100. Circuit Board PCB1 may then be connected to the playback portion 50 via connector CON1 and inserted into the internal cavity of the toy 20.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

What is claimed is:

1. A toy having at least one personalized voice message for selective playback comprising:

a toy having an internal cavity;

a message storage and playback device seated within said internal cavity, said message storage and playback device including at least one memory portion and a playback portion electrically interconnected to said at least one memory portion, each of said memory portions comprising an integrated circuit having a digitally recorded voice message stored therein and a timed output structured to output said voice message for a predetermined period of time, said playback portion including an audio output circuit and a transducer for retrieving said voice message from one of said memory portions and audibly outputting said voice message and a normally open momentary switch for activating said playback portion, said audio output circuit including means for automatically shutting off and limiting play back of said voice message so that said voice message is only played back once each time said switch is actuated; and wherein said means for automatically shutting off and limiting play back of said voice message comprises means for limiting current serially connected to and between said switch and a trigger input of said integrated circuit and a discharge capacitor connected in parallel with said means for limiting current, wherein upon continuous closure of said switch, said capacitor will discharge, thereby reducing current to said trigger input of said integrated circuit and causing said timed output to shut off after said predetermined period of time.

2. A toy having at least one personalized voice message for selective playback as recited in claim 1 wherein said toy is a stuffed animal.

3. A toy having at least one personalized voice message for selective playback as recited in claim 1 further comprising means for remote recording of said voice message in one of said memory portions.

4. A toy having at least one personalized voice message for selective playback as recited in claim 3 wherein said means for remote recording of said voice message in one of said memory portions comprises a computer interconnected with a public telephone system, said computer including means for receiving said voice message from said public telephone system and converting said voice message into a digital signal, a second memory portion for storing said digital signal and means for retrieving and downloading said digital signal from said second memory portion to said memory portion of said message storage and playback device.

5. A toy having at least one personalized voice message for selective playback comprising:

a toy having an internal cavity, a message storage and playback device positioned within said internal cavity, said message storage and playback device including at least one memory portion and a playback portion electrically connected to said at least one memory portion, each of said memory portions including a voice message stored therein and comprising an integrated circuit capable of storing said voice message and having a timed output structured to output said voice message for a predetermined period of time, said playback portion including an audio output circuit, a transducer for retrieving said voice message from one of said memory portions and audibly outputting said voice message, and means for activating said playback portion, comprising a normally open momentary switch, said audio output circuit including means for automatically shutting off and limiting play back of said voice message so that said voice message is only played back once each time said means for activating said playback portion is actuated, said means for automatically shutting off and limiting play back of said voice message comprising means for limiting current serially connected to and between said switch and a trigger input of said integrated circuit, and a discharge capacitor connected in parallel with said means for limiting current, wherein upon continuous closure of said switch, said capacitor will discharge, thereby reducing current to said trigger input of said integrated circuit and causing said timed output to shut off after said predetermined period of time.

6. A toy having at least one personalized voice message for selective playback as recited in claim 5 wherein said toy is a stuffed animal.

7. A toy having at least one personalized voice message for selective playback as recited in claim 5 further comprising means for remote recording of said voice message in one of said memory portions.

8. A toy having at least one personalized voice message for selective playback as recited in claim 7 wherein said means for remote recording of said voice message in one of said memory portions comprises a computer interconnected with a public telephone system, said computer including means for receiving said voice message from said public telephone system and converting said voice message into a digital signal, a second memory portion for storing said digital signal and means for retrieving and downloading said digital signal from said second memory portion to said memory portion of said message storage and playback device.

9. A system for remote recording of a personalized voice message into a toy comprising:

a toy having an internal cavity with a message storage and playback device including at least one memory portion electrically connected to a playback portion, each of said memory portions comprising an integrated circuit capable of storing said voice message and having a timed output structured to output said voice message for a predetermined period of time;

a computer connected to a public telephone system, said computer including means for receiving a plurality of voice messages from said public telephone system and converting each of said plurality of voice messages into a digital signal, a second memory portion for storing said digital signal and means for retrieving and downloading said digital signal from said second memory portion to one of said memory portions of said message storage and playback device; and said playback portion of said message storage and playback device including an audio output circuit and transducer for retrieving said digital signal from one of said memory portions and audibly outputting said voice message, and means for activating said playback portion comprising a normally open momentary switch, said audio output circuit including means for automatically shutting off and limiting play back of said voice message so that said voice message is only played back once each time said means for activating said playback portion is actuated, said means for automatically shutting off and limiting play back of said voice message comprising means for limiting current serially connected to and between said switch and a trigger input of said integrated circuit and a discharge capacitor connected in parallel with said means for limiting current, wherein upon continuous closure of said switch, said capacitor will discharge, thereby reducing current to said trigger input of said integrated circuit and causing said timed output to shut off after said predetermined period of time.

10. A toy having at least one personalized voice message for selective playback as recited in claim 9 wherein said toy is a stuffed animal.

* * * * *